(12) United States Patent
Rimmer et al.

(10) Patent No.: US 12,498,283 B1
(45) Date of Patent: Dec. 16, 2025

(54) DETERMINING A CONDITION OF AN ELECTRIC SUBMERSIBLE PUMP USING ORTHOGONAL ACCELEROMETERS

(71) Applicant: Halliburton Energy Services, Inc., Houston, TX (US)

(72) Inventors: Michael Rimmer, Frimley (GB); John George Nassif Badawi, Frimley (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/891,141

(22) Filed: Sep. 20, 2024

(51) Int. Cl.
| | |
|---|---|
| G01M 1/22 | (2006.01) |
| E03B 5/04 | (2006.01) |
| E21B 43/12 | (2006.01) |
| E21B 47/008 | (2012.01) |
| F04D 13/08 | (2006.01) |
| F04D 15/00 | (2006.01) |
| F04D 15/02 | (2006.01) |

(52) U.S. Cl.
CPC ............ G01M 1/22 (2013.01); E21B 43/128 (2013.01); E21B 47/008 (2020.05); *E03B 5/04* (2013.01); *F04D 13/086* (2013.01); *F04D 15/0066* (2013.01); *F04D 15/0281* (2013.01)

(58) Field of Classification Search
CPC ...... G01M 1/22; E21B 43/128; E21B 47/008; E03B 5/04; F04D 13/086; F04D 15/0066; F04D 15/0281
See application file for complete search history.

(56) References Cited

U.S. PATENT DOCUMENTS

| | | | |
|---|---|---|---|
| 10,865,633 B2 * | 12/2020 | Coste | E21B 47/26 |
| 2002/0124652 A1 * | 9/2002 | Schultz | E21B 47/18 |
| | | | 73/152.47 |
| 2004/0141420 A1 * | 7/2004 | Hardage | E21B 47/01 |
| | | | 367/149 |

(Continued)

FOREIGN PATENT DOCUMENTS

| | | |
|---|---|---|
| CN | 211924497 U | 11/2020 |
| WO | 2016205100 A1 | 12/2016 |

OTHER PUBLICATIONS

Reges et al., A new method for the vibration amplitude assessment of the ESP systems considering the vibration orbit, Journal of Petroleum Science and Engineering https://doi.org/10.1016/j.petrol.2022.110214 Available online Jan. 26, 2022 0920-4105/Â © 2022 Elsevier B.V. All rights reserved. (Year: 2022).*

(Continued)

*Primary Examiner* — Dominick L Plakkoottam
(74) *Attorney, Agent, or Firm* — Conley Rose, P.C.; Rodney B. Carroll

(57) ABSTRACT

A method of determining a condition of an electric submersible pump (ESP) includes gathering acceleration data from a first accelerometer and a second accelerometer. The first accelerometer and the second accelerometer are affixed to the ESP. The first accelerometer is oriented orthogonally with respect to the second accelerometer. The method further includes obtaining orbit data from the acceleration data, determining a magnitude and/or phase angle of a harmonic of a rotational frequency of a motor of the ESP based on the orbit data, and determining a condition of the ESP based on the magnitude and/or phase angle of the harmonic.

24 Claims, 11 Drawing Sheets

(56) References Cited

U.S. PATENT DOCUMENTS

| | | | |
|---|---|---|---|
| 2007/0156289 A1* | 7/2007 | Altieri | F16F 15/002 |
| | | | 700/280 |
| 2011/0050145 A1 | 3/2011 | Plitt et al. | |
| 2020/0284138 A1* | 9/2020 | Bowler | E21B 47/008 |
| 2021/0172443 A1 | 6/2021 | Brown et al. | |
| 2022/0099086 A1 | 3/2022 | Lindeman et al. | |
| 2022/0186749 A1* | 6/2022 | Eckl | F04D 15/0066 |
| 2022/0195862 A1* | 6/2022 | Chen | E21B 47/18 |

OTHER PUBLICATIONS

Foreign Communication from Related Application—International Search Report and Written Opinion of the International Searching Authority, International Application No. PCT/US2024/051767, dated Jun. 11, 2025, 10 pages.

* cited by examiner

US 12,498,283 B1

DETERMINING A CONDITION OF AN ELECTRIC SUBMERSIBLE PUMP USING ORTHOGONAL ACCELEROMETERS

CROSS-REFERENCE TO RELATED APPLICATIONS

None.

STATEMENT REGARDING FEDERALLY SPONSORED RESEARCH OR DEVELOPMENT

Not applicable.

BACKGROUND

Vibration data can contain information indicating the condition of an ESP string (motor, protector, pump intake, pump). Typically, this requires a lot of different sensor types to assess the magnitudes of acceleration (e.g. accelerometer sensor), velocity (e.g. velomitor sensor) and displacement (e.g. proximity sensor). Processing of the data can allow inference of various causes of the vibration in the ESP. However, it is not always practical for a multitude of vibration sensors to be installed due to the physical downhole environment, the media they are operating in, and due to limited space to physically install the sensors. The system and method of the present disclosure may address one or more of these issues.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

As used herein the terms "uphole", "upwell", "above", "top", and the like refer directionally in a wellbore towards the surface, while the terms "downhole", "downwell", "below", "bottom", and the like refer directionally in a wellbore towards the toe of the wellbore (e.g. the end of the wellbore distally away from the surface), as persons of skill will understand. Orientation terms "upstream" and "downstream" are defined relative to the direction of flow of fluid, for example relative to flow of well fluid in the well. As used herein, orientation terms "upstream," "downstream," are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid.

The systems and methods of the present disclosure may allow processing and subsequent visualization and characterization of a vibration using two orthogonal accelerometers. The accelerometers may be typically sufficiently compact and robust to be installed in a downhole environment (e.g. in the sensor module of the ESP). Acceleration data from the accelerometers may be processed to produce the velocity and displacement. The displacement data may be used to determine a condition of the ESP.

Figure 1A:
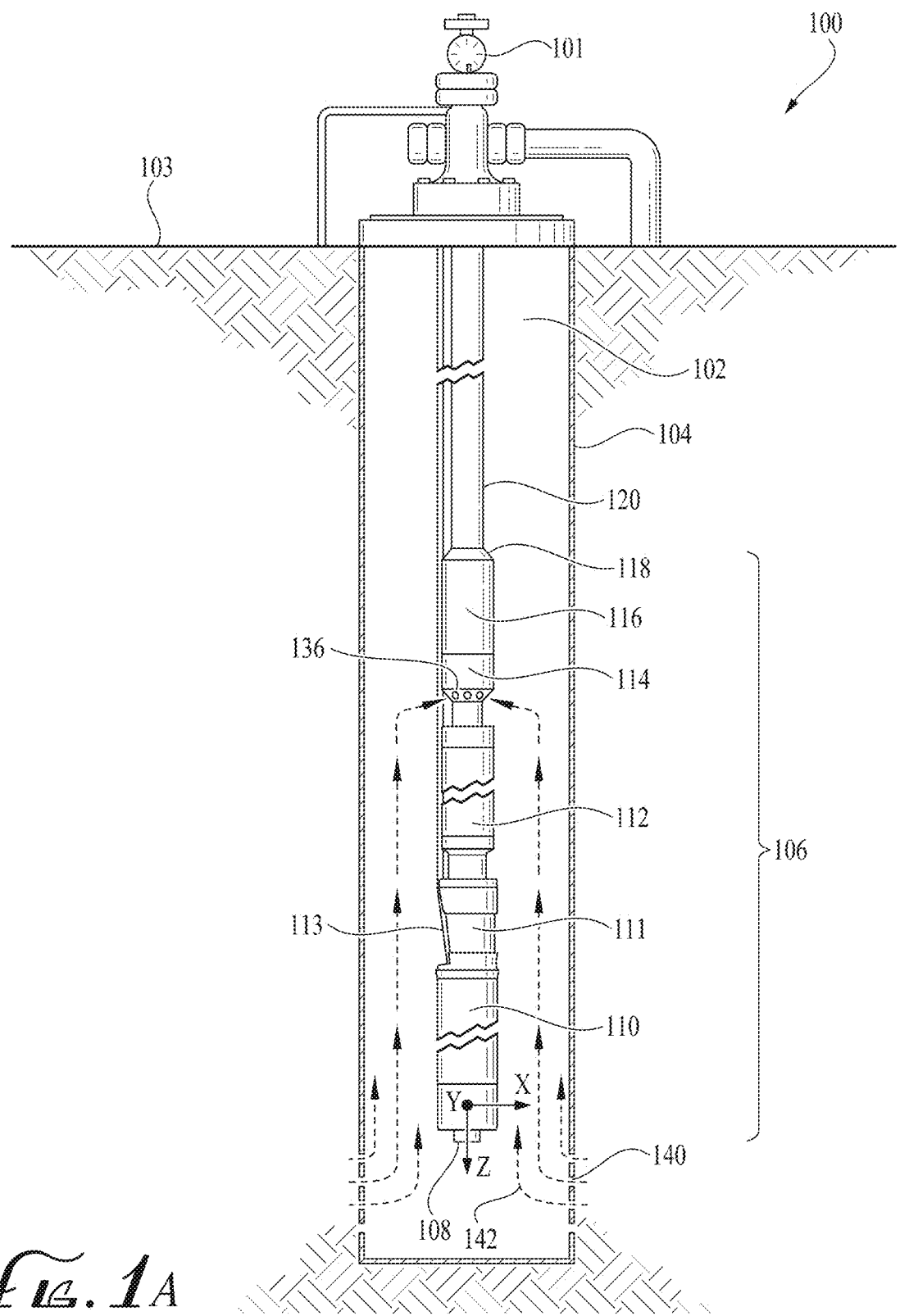
FIG. 1A is a schematic illustration of an exemplary electric submersible pump (ESP) assembly disposed in a wellbore, according to an embodiment.

Referring to FIG. 1A, an exemplary producing well environment 100 is shown. In some embodiments, the environment 100 comprises a wellhead 101 above a wellbore 102 located at the surface 103. A casing 104 may be provided within the wellbore 102. An exemplary electric submersible pump (ESP) assembly 106 may be deployed downhole in a well within the casing 104 and may include a sensor unit 108, an electric motor 110 which may include a motor head 111, a seal unit 112, an electric power cable 113, a pump intake 114, a centrifugal pump 116, and a pump outlet 118 that couples the centrifugal pump 116 to a production tubing 120. The centrifugal pump 116 may be operatively coupled to the motor 110 by a shaft. The ESP assembly 106 may employ bearings in several places, for example in the electric motor 110, in the seal unit 112, and/or in the centrifugal pump 116. The ESP assembly 106 may comprise a gas separator that may employ one or more bearings. The motor head 111 couples the electric motor 110 to the seal unit 112. The electric power cable 113 may connect to a source of electric power at the surface 103 and to the electric motor 110, for example being configured to provide power from the source of electric power at the surface 103 to the electric motor 110. Cable 113 may also be configured to transmit data from sensor 108 to surface 103.

The casing 104 may be pierced by perforations 140, and reservoir fluid 142 may flow through the perforations 140 into the wellbore 102. The fluid 142 may flow downstream in an annulus formed between the casing 104 and the ESP assembly 106, be drawn into the pump intake 114, be pumped by the centrifugal pump 116, and be lifted through the production tubing 120 to the wellhead 101 to be produced at the surface 103. The fluid 142 may comprise hydrocarbons such as oil and/or gas, water, or both hydrocarbons and water.

While the example illustrated in FIG. 1A relates to land-based subterranean wells, similar ESP systems can be used in a subsea environment and/or may be used in subterranean environments located on offshore platforms, drill ships, semi-submersibles, drilling barges, etc. And while the wellbore is shown in FIG. 1A as being approximately vertical, in other embodiments, the wellbore may be horizontal, deviated, or any other type of well. The system and method of the present disclosure can also be applied to horizontal pumping systems. Also, while the pump of the ESP is described with respect to FIG. 1A as a centrifugal pump, other types of pumps (such as a rod pump, a progressive cavity pump, any other type of pump suitable for the system, or combinations thereof) may be used instead. As used herein, the term "ESP" generally refers to any one or more components of the ESP assembly/string 106 or to the entire ESP assembly/string 106.

Figure 1B:
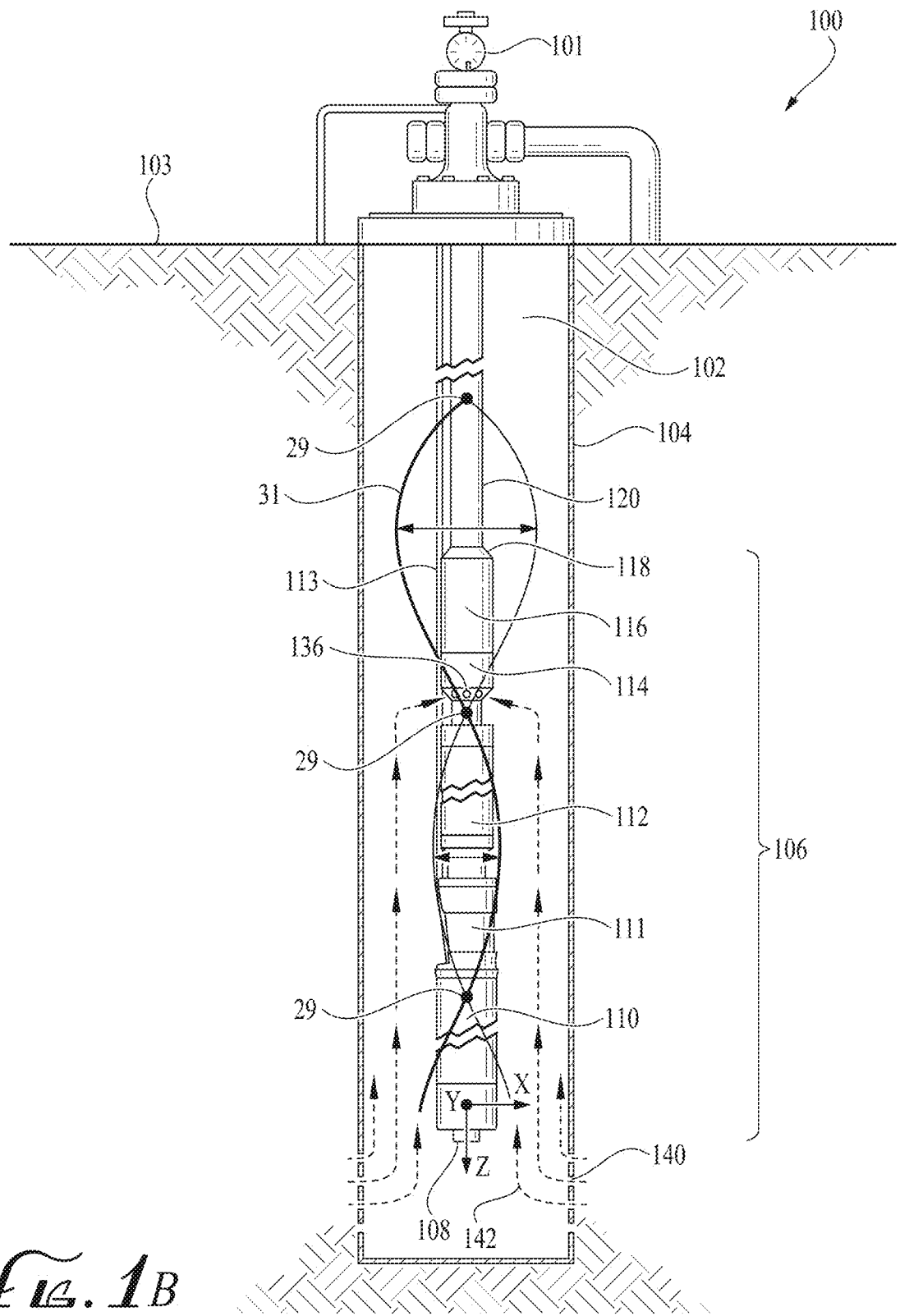
FIG. 1B is a schematic illustration of an exemplary ESP disposed in a wellbore that is vibrating, according to an embodiment.

The sensor unit 108 may include two orthogonal accelerometers. A coordinate system is shown with respect to this exemplary location for the orthogonal accelerometers. The x-direction may be the direction of one of the accelerometers and the y-direction may be the direction of the other accelerometer. The x-direction and the y-direction may be radial directions with respect to the ESP assembly 106. In embodiments in which the two orthogonal accelerometers are part of a 3-axis accelerometer, the third accelerometer may be oriented in the z-direction, which is in the axial direction with respect to the ESP assembly 106. While this particular Cartesian coordinate system coordinate system is present in this particular embodiment, in other embodiments, there may be a cylindrical coordinate system or any other suitable type of coordinate system. Accelerometers 10 (see FIG. 2) may additionally or alternatively be placed in or on other parts of the ESP assembly 106 such as the centrifugal pump 116, the pump intake, the protector, the production tubing 120, or any other location. In some embodiments, the accelerometers are contained inside a band encircling part of the ESP, for example, the motor 110. The accelerometers may be distributed along the length of the ESP string. The accelerometers may be distributed at an interval, for, example, with one meter between accelerometer pairs. In such cases, the processor may interpolate points between the orbits to generate data of how the ESP string 106 vibrates along its length. FIG. 1B shows exemplary standing wave 31 of the ESP string 106 as it vibrates. Nodes 29, points of zero vibration, may be identified from the interpolation. One advantage of the longitudinally distributed accelerometer pairs may be that if one or more of the pairs are disposed on a node, other accelerometers not positioned on a node will still be able to detect vibrations that may be present. Identification of the vibrational shape and position of the nodes may be used along with the magnitudes and phase angle of harmonics to determine the condition of the ESP 106.

The acceleration data gathered from the accelerometers may comprise measurements of acceleration of the ESP string 106 as it vibrates. This may be measured with an accelerometer. The typical output may be related to the force of gravity (e.g. 0.1G, where 1G=9.81 m/s$^2$). Accelerometers may be able to sample at high frequency. Vibration data may be gathered which may comprise measurements of velocity of the ESP string 106 as it vibrates. This may be measured using a velometer, which may have an output in mm/s or in/s. These sensors may output the RMS average of vibration. The velocity data may be used to compare different machine vibrational characteristic for both design acceptance and operational safety (e.g. ISO Balance Grades G2/5=2.5 mm/s; ISO15551-1:2015 limits ESP vibration to ~5.08 mm/s vertically 3.96 mm/s horizontally). Displacement data may comprise measurements of the displacement due to the vibration. This data may be used to measure shaft displacement relative to the housing using a set of non-contacting proximity or eddy current probes. Displacements may be on the order of 10 microns. It may be advantageous to measure acceleration, velocity and displacement using a single sensor according to various embodiments discussed below.

The processor-implemented method of the present disclosure may comprise integrating and/or differentiating to convert between acceleration data, velocity data, and displacement data. For simple harmonic motion may comprise a rotating velocity of ω (radians per second) with time t (seconds), a phase angle of φ (radians) and an acceleration peak magnitude of A (meters/second$^2$). The acceleration equation may be integrated to produce velocity and displacement equation as follows: Acceleration=$A \cdot \cos(\omega t+\varphi)$; Velocity=$A/\omega \cdot \sin(\omega t+\varphi)$; and Displacement=$-A/\omega^2 \cdot \cos(\omega t+\varphi)$. The conversions can be run in reverse by differentiation with a peak displacement value of D: Displacement=$D \cdot \cos(\omega t+\varphi)$; Velocity=$-D \cdot \omega \cdot \sin(\omega t+\varphi)$; and Acceleration=$-D \cdot \omega^2 \cdot \cos(\omega t+\varphi)$. Velocity with a peak vibration value of V may be converted to acceleration and displacement as follows: Velocity=$V \cdot \sin(\omega t+\varphi)$; Acceleration=$V \cdot \omega \cdot \cos(\omega t+\varphi)$; Displacement=$-V/\omega \cdot \cos(\omega t+\varphi)$. The system and method of the present disclosure may integrate the acceleration data to obtain velocity data and integrate again to obtain displacement data. This may be achieved, for example, by processing the acceleration data by sampling at a rate much higher than the operating frequency. The time between samples is known, therefore the data can be integrated by calculating the area under the curve, e.g., for two points $A_m$ and $A_{m+1}$ at times step dt the integral is $V_m=(A_m+A_{m+1})/2 \cdot dt$. The data set can be assumed as cyclic so for the last point "m" in the data set the integral can be assumed as $V_m=(A_m+A_1)/2 \cdot dt$. This process can be repeated to obtain displacement data.

Figure 2:
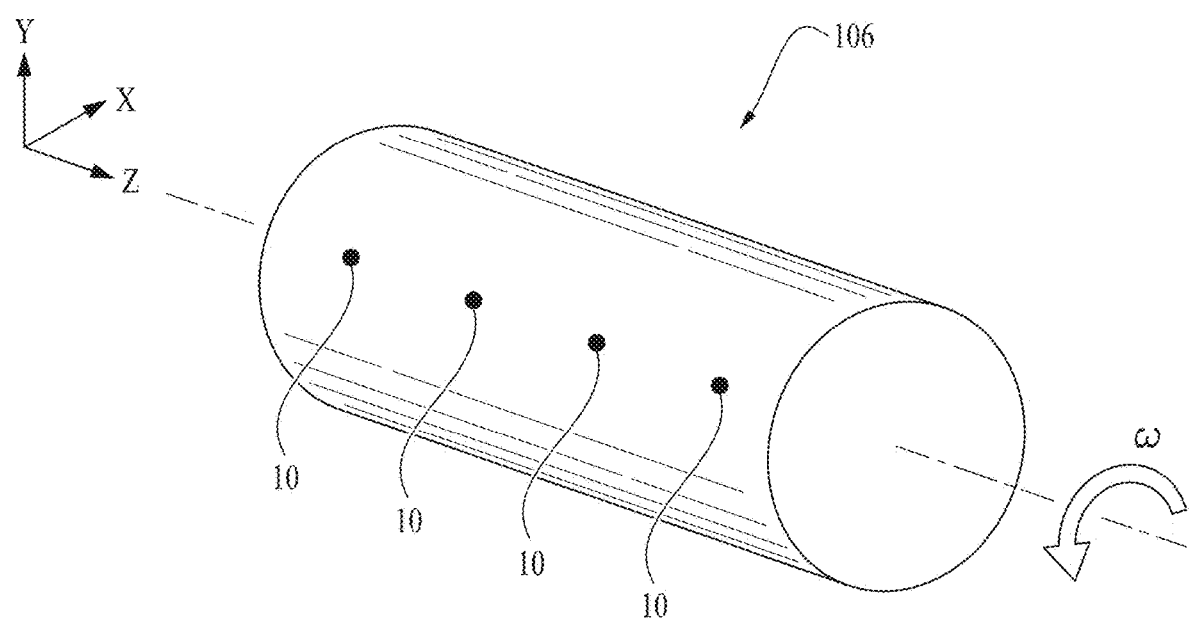
FIG. 2 is a conceptual illustration of a coordinate system of the ESP string, according to an embodiment.

Referring to FIG. 2, the ESP string 106 may be represented simply as a cylinder to illustrate concepts related to the coordinate system. The direction of rotation of the shaft is denoted as ω. According to the coordinate system, X and Y are radial directions and Z is an axial direction with respect to the ESP string 106. The accelerometers may be mounted in or on any non-rotating part of the ESP string 106. Orthogonal pairs of accelerometers 10 may be placed at multiple locations along the length of the ESP string 106. This may be advantageous if a vibrational node of the ESP string 106 happens to occur at the same location as one of the pairs of accelerometers. In such case, other accelerometers that are not located at a node can detect the vibration.

In some embodiments, the electric submersible pump 106 includes an impeller configured to lift fluid in a wellbore; a motor configured to drive the impeller; a housing enclosing the impeller and the motor; pairs of accelerometers 10 longitudinally distributed along the housing. The accelerometers being "longitudinally distributed along the housing" means that the accelerometers 10 can be distributed anywhere on or inside the housing as long as there is at least some spacing in the longitudinal direction. Each of the pairs of accelerometers 10 may include a first accelerometer and a second accelerometer oriented orthogonally with respect to the first accelerometer. Alternatively, there can be one package with triaxial accelerometers. One or more processors may be configured to gather accelerometer data from the pairs of accelerometers 10, obtain orbit data from the accelerometer data, determine magnitudes of harmonics at locations of the pairs of accelerometers, and determine a condition of the electric submersible pump 106 based on the magnitudes of the harmonics. The acceleration data of the first accelerometer may comprise acceleration measured by the first accelerometer over time. The acceleration data of the second accelerometer may comprise acceleration measured by the second accelerometer over time. The orbit data may comprise x-position and y-position over time obtained by twice integrating the acceleration data of the first accelerometer and the acceleration data of the second accelerometer. An operation of the motor may be altered based on the determined conditions. Magnitudes of harmonics may be interpolated between the locations of the pairs of accelerometers to obtain a profile of the magnitudes of the harmonics (e.g., along at least part of the length of the ESP and/or ESP housing). The one or more processors may be further configured to determine the condition of the electric submersible pump based on the profile of the magnitudes of the harmonics. The one or more processors may be further configured to gather data from the pairs of accelerometers 10 when the motor is accelerating, and process the data to obtain the profile of the magnitude of harmonics as a function of motor speed. This profile may be analyzed to determine a motor speed that does not damage the ESP 106. The processor and/or a controller may then set the motor to run at this speed. In some embodiments, the condition of the electric submersible pump 106 is determined using a machine learning algorithm.

Figure 3:
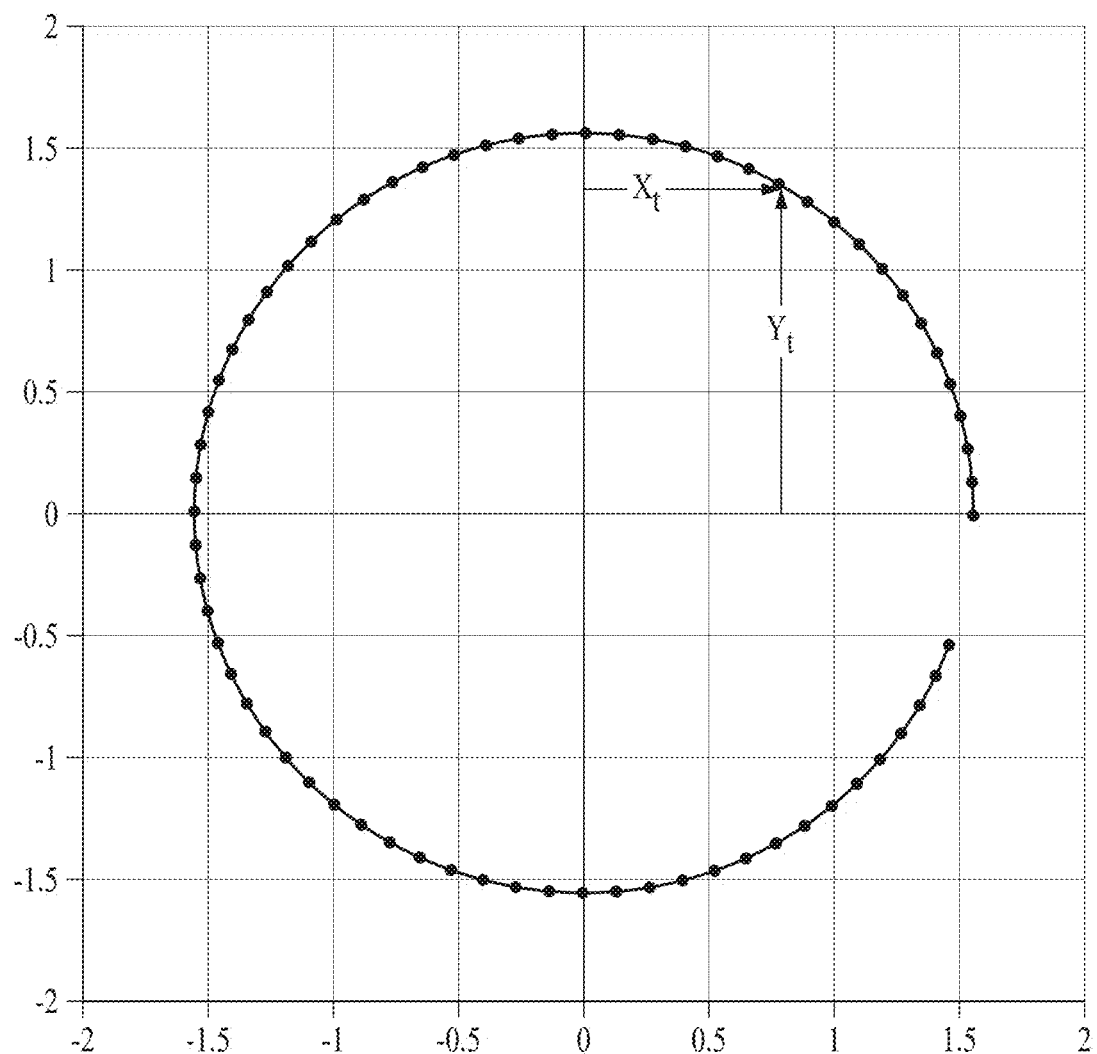
FIG. 3 is a graph of an exemplary circular orbit of an ESP, according to an embodiment.

The vibration characteristics may not be the same in all three axis of the ESP string 106. The Z axis may lie on the rotational axis and from a vibration sense may be a measure of the axial vibration of the ESP system. The X and Y axis may lie at 90° with respect to the Z axis in the horizontal and vertical plane, respectively. The X and Y accelerometer data may therefore measure the radial vibration. As the shaft of the ESP string rotates, the X and Y data may be interrelated by time ($X_t$, $Y_t$). Consequently, if sampled repeatedly at a speed greater than rotation frequency of the ESP, the points will trace out an "orbit" shape, as shown in FIG. 3. The orbit may repeat for every 360° rotation of the shaft.

Figure 4A:
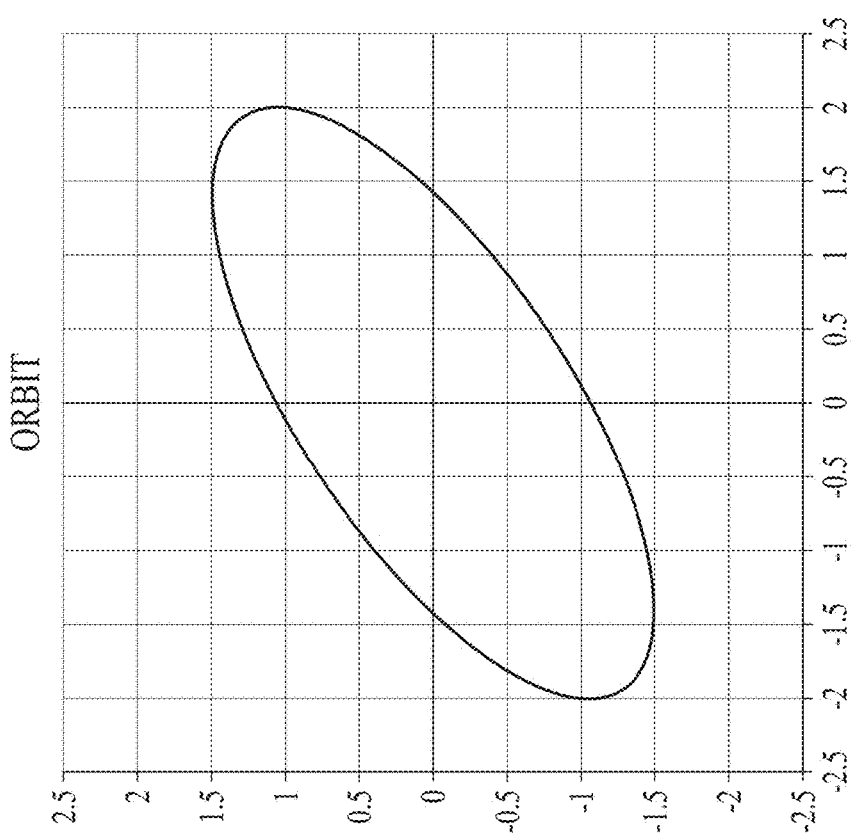
FIG. 4A is an exemplary graph of an elliptical orbit of an ESP, according to an embodiment.
Figure 4B:
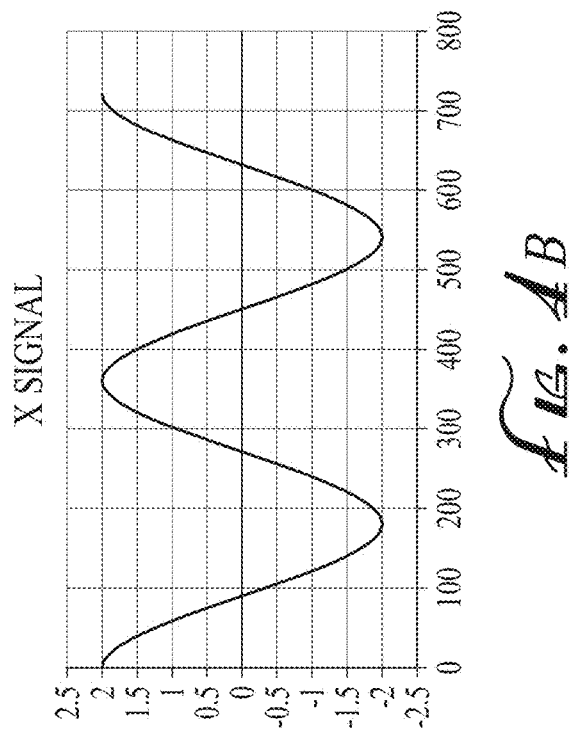
FIG. 4B is an exemplary graph of the x-component of the orbit of FIG. 4A.
Figure 4C:
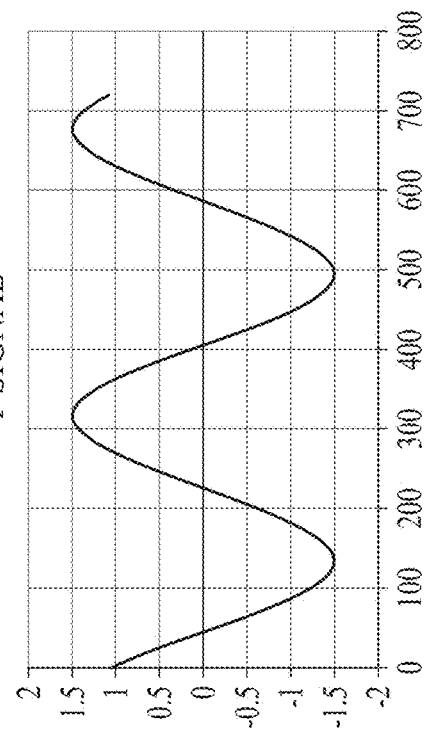
FIG. 4C is an exemplary graph of the y-component of the orbit of FIG. 4A.

In practice, the path plotted may be much more complex than a circle. Firstly, the peak level of vibration in the X direction may not be the same as the peak level of vibration in the Y direction. Similarly, the phase angle ($\varphi_X$) in the X direction may be different from the phase angle ($\varphi_Y$) in the Y direction. These differences may be due to the underlying design of the motor, e.g. bearing type, working fluid, control, gravity, supports, etc. Such differences may skew the orbit into an elliptical shape, such as the one shown in FIG. 4. Secondly, multiple frequencies may be present within the vibration spectrum (e.g. harmonics). The harmonics may be represented by multiples of the operating frequency (f). For instance, if the motor spins at 3600 rpm, the $1^{st}$ harmonic ("1×") is at 60 Hz (f=RPM/60=ω/2π). The second harmonic is located at "2×" the $1^{st}$ harmonic frequency (i.e. 120 Hz). This can similarly be extended to any higher harmonic following the form n·f where n is the harmonic number, i.e. 3×, 4×, 5×, 6× etc. Similarly, fractional harmonics can occur, i.e. ½×, ⅓×, ¼×, ⅕×, ⅙× etc. Partial harmonics may also occur, i.e. 1.5×, 2.5×, 3.5×, 4.5× etc.

Figure 5B:
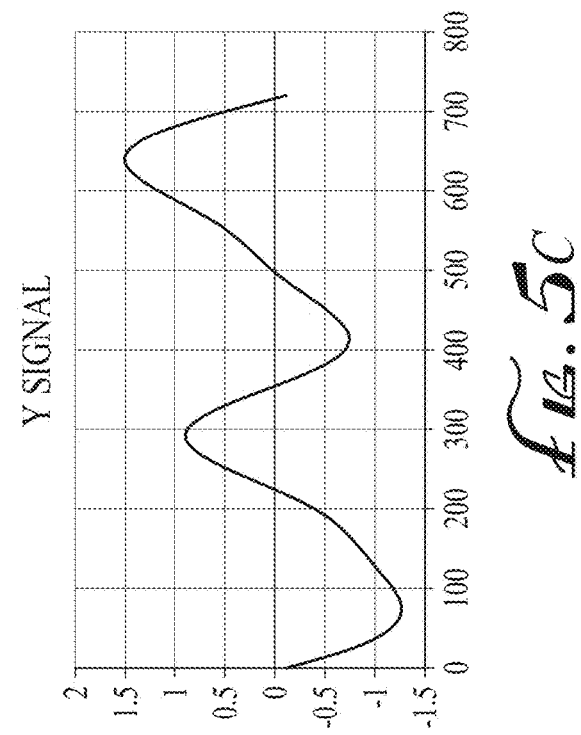
FIG. 5B is an exemplary graph of the x-component of the orbit of FIG. 5A.
Figure 5C:
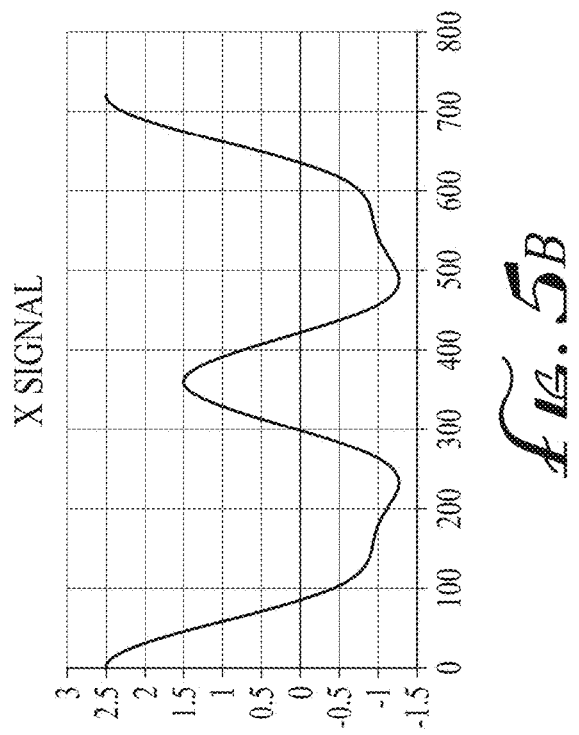
FIG. 5C is an exemplary graph of the y-component of the orbit of FIG. 5A.

Referring to FIG. 5, an example of an orbit including a 0.5×, 1×, and 2× harmonic is shown. The system and method may analyze the orbits to estimate the magnitude and phase of the unbalance in the ESP string. This may be achieved by having a tachometer signal (e.g., a pulse generated once per revolution of the shaft). The pulse may indicate the start of one rotation of the shaft, i.e., a phase angle of 0°. This tachometer signal may be output by a sensor installed on the motor that detects a notch or similar structure passing by the sensor. Alternatively, the data may be processed to determine the zero crossing points of the wave form. In a typical sinusoidal waveform that is output from the sensor, the curves will cross the axis twice per rotation. For a pure sinewave, these will occur every half rotation. The system and method may recognize every other zero crossing point as the zero angle (e.g., replacing the tachometer signal). Further processing can be included to account for harmonics in the signal. For instance, the 1× sinewave can be derived from the vibrational data and the zero crossing points of the signal determined. A low pass filter can be applied to determine the zero crossings for very noisy (high harmonic content) acceleration signals.

The acceleration magnitude (A) may be generated by the unbalance of the rotor. This unbalance may be an amount of mass of m (kg) offset from the shaft centerline by a distance r (m) due to imperfections (e.g., the manufacturing tolerances of the rotor). The unbalance may create a rotating force F following the equation $F=m·\omega^2·r$, where acceleration is $A=\omega^2·r$. Therefore, in a perfect system subject to unbalance alone the orbit may be circular. As the complexity of the system increases, harmonic location, harmonic magnitudes, and harmonic phase angle may start to affect the orbit. The system and method may involve analyzing the shape of the orbit to diagnose potential issues or causes of issues of the ESP. For example, the method may interpret a strong $2^{nd}$ harmonic "2×" (e.g., a $2^{nd}$ harmonic greater than a threshold) as indicative of a shaft bend. The method may interpret a strong ½× harmonic (e.g., a ½× harmonic greater than a threshold) as indicative of a rub between static and rotating components. The method may recognize that the ½× harmonic may also be due to the operation of a fluid film bearing which would not cause damage to the motor, whereas a rub would be considered more serious. Thus, the method may take into account other factors to determine whether the strong ½× harmonic is indicative of a rub. For example, a machine learning algorithm may be used to resolve uncertainty as to the cause of the ½× harmonic. The method may involve determining a condition of the ESP based on changes in the vibration characteristic, comparing data to an expected operation characteristic, and/or long-term trending.

In some embodiments, in response to detecting the condition (e.g., the rub), the processor may display a warning on a screen. The operator may then use this information to decide to stop the ESP and remove it for repairs. In sudden and/or severe cases (e.g., the processor determines that the rub is severe enough to cause immediate damage), the processor may automatically cut power to the ESP, in response to detecting the condition (e.g., rub), to prevent severe or irreversible damage to the ESP.

Figure 6:
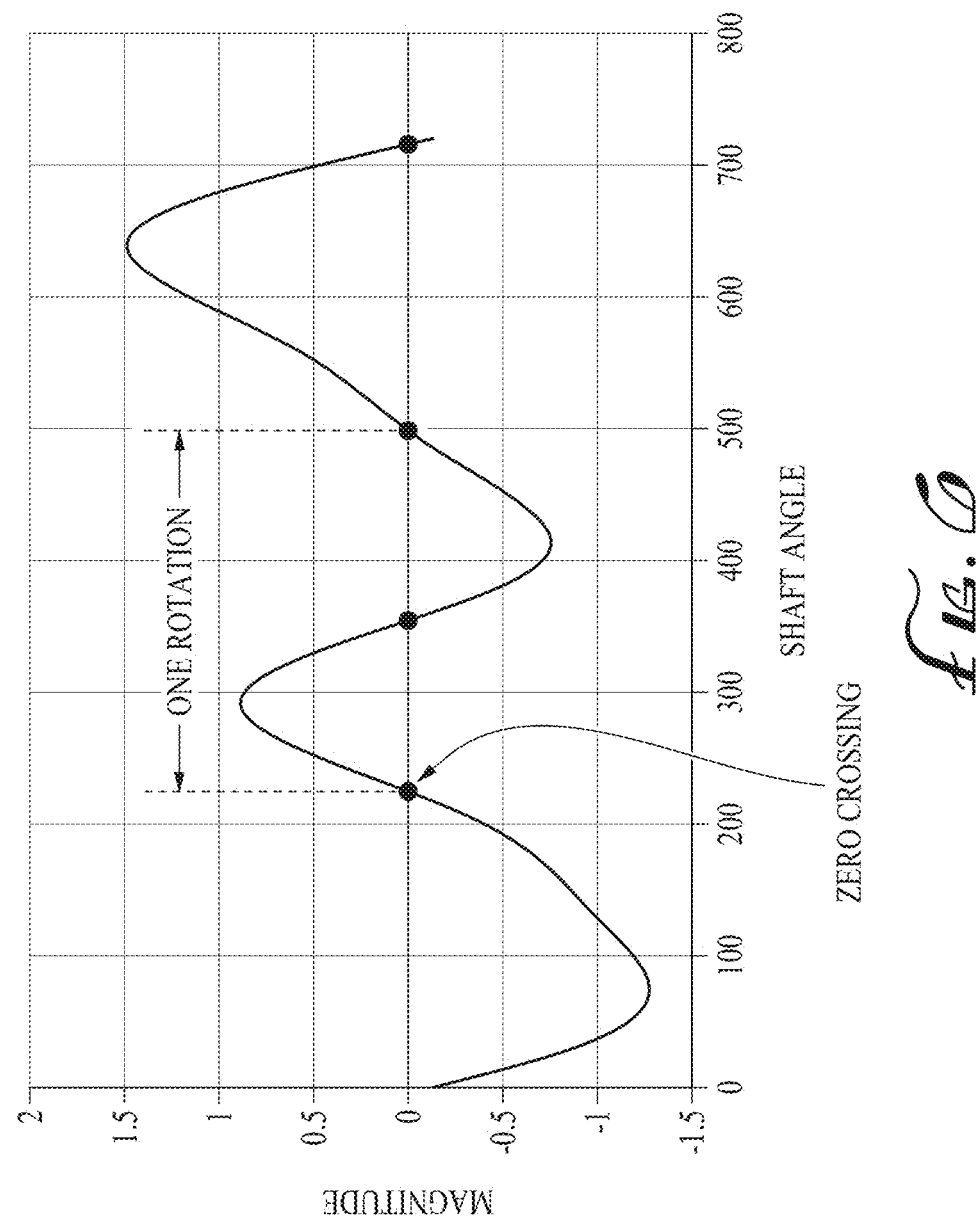
FIG. 6 is a conceptual illustration of zero crossing points in a graph of magnitude as a function of shaft angle, according to an embodiment.

Referring to FIG. 6, zero crossing point may be used to determine the phase angle. In the example of FIG. 6, there is a waveform that comprises a sine wave with additional harmonics. Even through it is not a perfect sine wave, it still crosses zero twice per revolution of the shaft. Every other crossing of zero may be considered a new cycle. Thus, the processor may determine the phase angle from the zero crossing points.

Figure 5A:
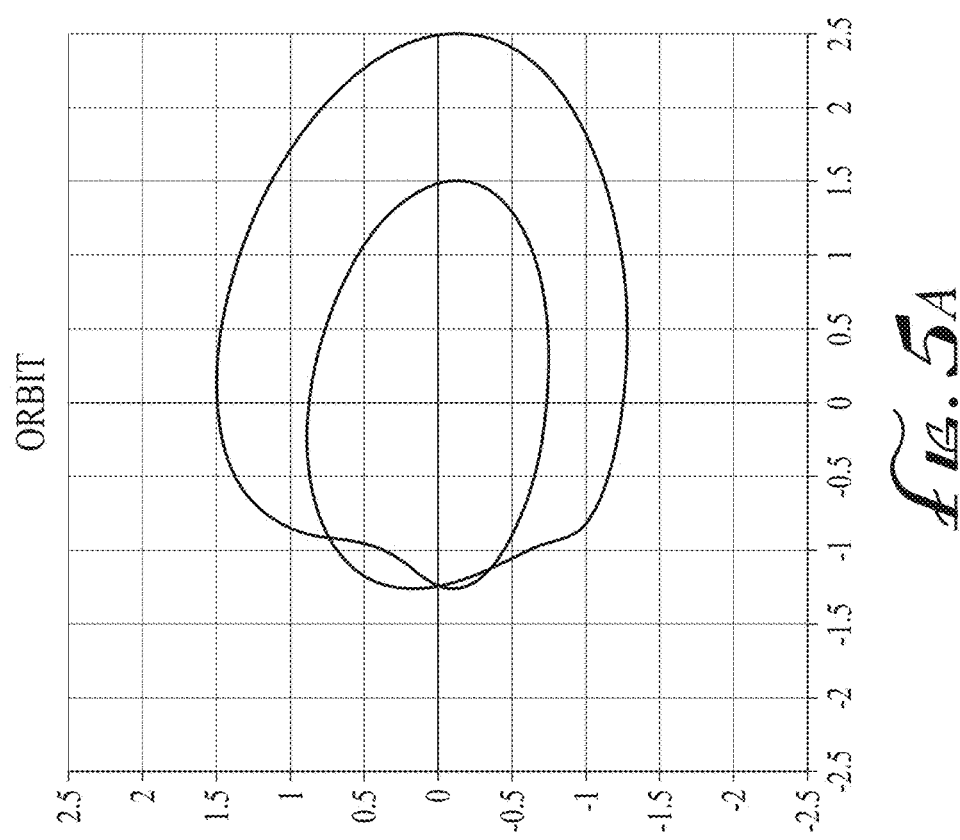
FIG. 5A is an exemplary graph of an orbit of the ESP with multiple harmonics, according to an embodiment.

The processor may identify the presence and/or the magnitude of harmonics based on the shape and/or size of the orbit and the zero crossing points. In the example of FIG. 5A, the processor may recognize the presence of a ½ harmonic if there are two points on the orbit that indicate a start of a cycle (e.g., the start of the cycle being determined by the zero crossing points). On the other hand, the processor may recognize the presence of the $2^{nd}$ harmonic if there is one point on the orbit (i.e., the orbit loops twice before repeating). In another example, the processor may determine the presence of the fifth harmonic by recognizing a pentagon shape of the orbit. The processor may further determine the magnitude of the present harmonics based on the size (e.g., magnitude) of the loops.

Figure 7:
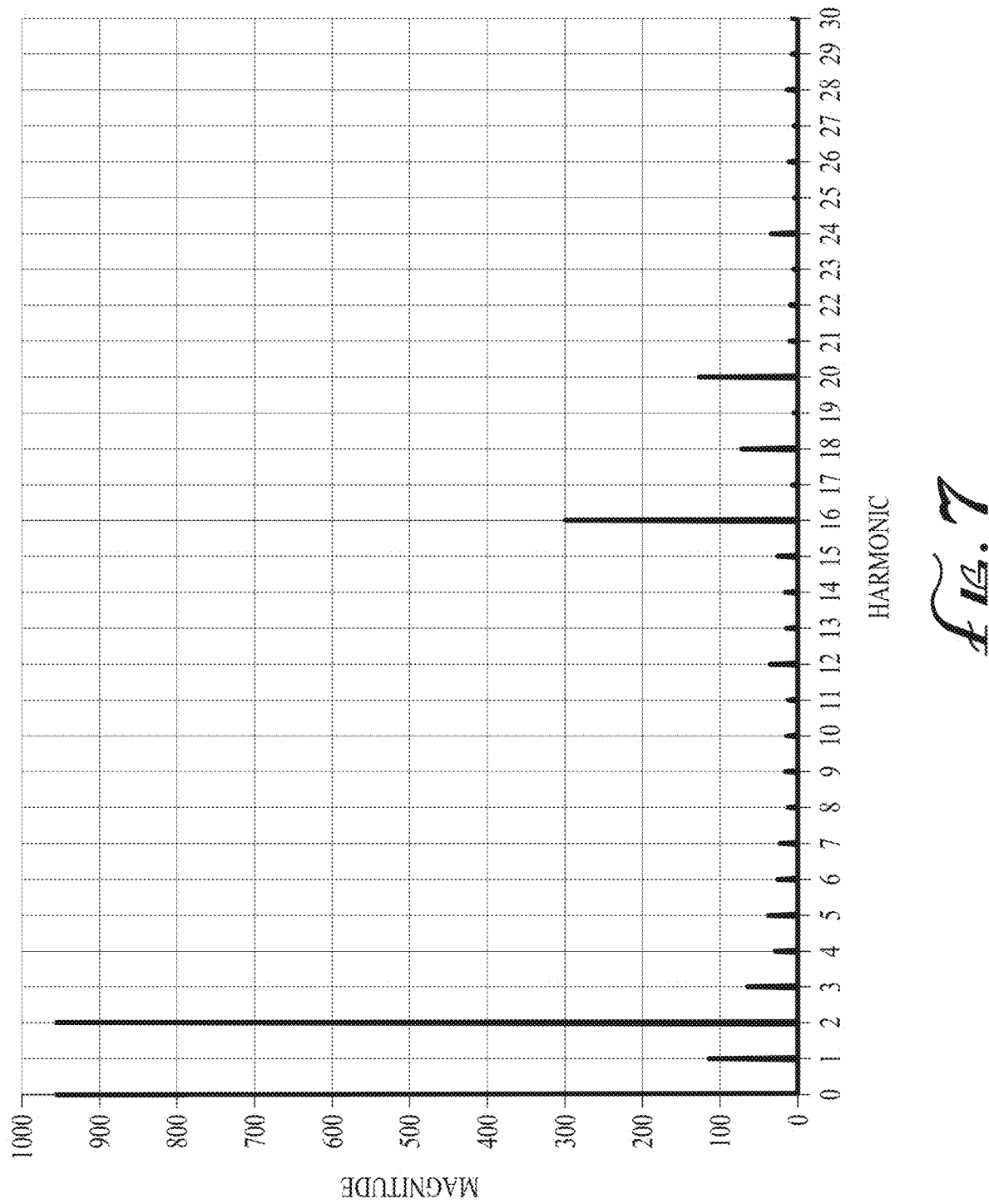
FIG. 7 is a graph of magnitude of harmonics of the ESP, according to an embodiment.

In some embodiments, shape and magnitude are judged to determine machine health (e.g., by a machine learning algorithm such as a neural network). In some embodiments, a Fast Fourier Transform (FFT), Discrete Fourier Transform (DFT), or similar time to frequency conversion method, may be performed on the X, Y and/or Z data. The FFT (or similar) may pick out the harmonic frequencies and/or may create a plot of magnitude vs. frequency and/or phase angle vs. frequency. The frequency generated from the FFT (or similar) may be divided by the 1× frequency (e.g., the motor speed) to obtain data or plots of the harmonic numbers. An example of such a plot is shown in FIG. 7. The method may include generating waterfall data and/or making waterfall plots. This may be generated in much the same way as FFT (or similar) but extended to a third axis to show how the FFT (or similar) changes as the speed of the shaft is changed (e.g. can be done at start up as the motor accelerates the ESP string to full speed). The condition of the motor can further be determined based on the FFT (or similar) and/or the waterfall plot. In some embodiments, the processor analyzes the waterfall plot to find a motor speed that minimizes a magnitude of one or more harmonics (e.g., ½ and/or 2× harmonics), and sets the motor to that speed. This may reduce wear and/or damage to the motor.

Figure 8:
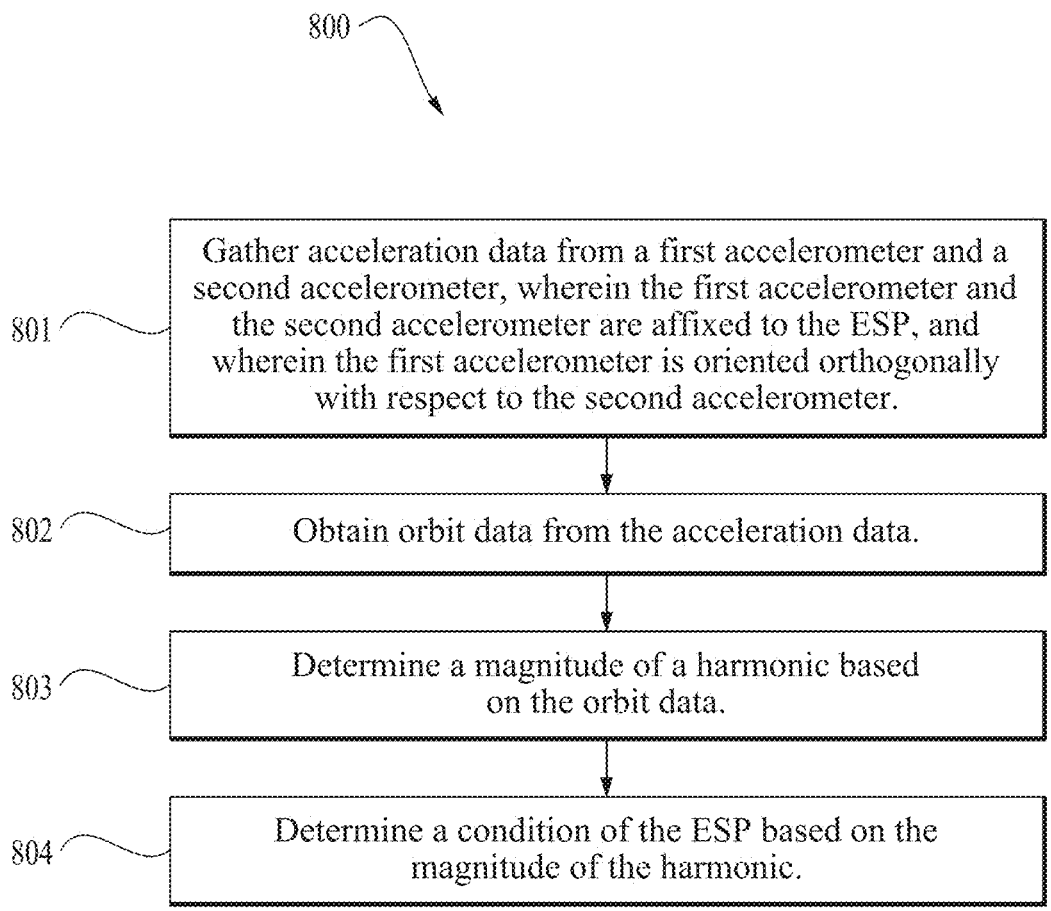
FIG. 8 is a flow diagram of a method of determining a condition of the ESP, according to an embodiment.

Referring to FIG. 8, a method 800 of determining a condition of an electric submersible pump (ESP) may include the step 801 of gathering acceleration data from a first accelerometer and a second accelerometer, wherein the first accelerometer and the second accelerometer are affixed to the ESP (e.g., ESP string), and wherein the first accelerometer is oriented orthogonally with respect to the second accelerometer (e.g., both accelerometers are in one package in a triaxial accelerometer); the step 802 of obtaining orbit data from the acceleration data; the step 803 of determining a magnitude of a harmonic of a rotational frequency of a motor of the ESP based on the orbit data; and the step 804 of determining a condition of the ESP based on the magnitude of the harmonic.

The ESP may be adjusted based on the determined condition. The method may further include determining a phase of an imbalance of the ESP based on the orbit data, wherein the condition of the ESP is further determined based on the phase. The condition of the ESP may be based on a shape of the orbit. The orbit may include x-values of displacement and y-values of displacement as a function of time. The ESP may be stopped, in response to the magnitude and the phase indicating imminent damage to the ESP. The determining of the magnitude of the harmonic of a rotational frequency of a motor of the ESP may include determining a magnitude of vibration at a natural frequency of the ESP based on the orbit, and adjusting a speed of the ESP, in response to determining that the magnitude of vibration at the natural frequency of the ESP exceeds a threshold.

The method 800 may further include integrating the acceleration data over time to generate velocity data, wherein the determining of the condition of the ESP is further based on the velocity data. The method 800 may further include integrating the velocity data over time to generate positional data, wherein the orbit data comprises the positional data. The orbit data may be obtained by twice integrating the acceleration data. The orbit data may be generated based on a signal from a tachometer coupled to a shaft of the ESP. The orbit data may be alternatively generated by detecting zero crossing points of a waveform of the accelerometer data. The harmonic may be a second harmonic of a rotational frequency of a motor of the ESP.

The determining of the condition of the ESP may include determining that a shaft of the ESP is bent, in response to determining that the magnitude of a second harmonic exceeds a threshold. This bend may be due to the motor being positioned in a severe dog leg. The harmonic may be a half harmonic of a rotational frequency of a motor of the ESP. The determining of the condition of the ESP may comprise determining that there is a rub between a static component of the ESP and a rotating component of the ESP, in response to detecting that the magnitude of the half harmonic exceeds a threshold. The adjustment of the ESP may include stopping the ESP for repairs. The adjustment of the ESP may include adjusting a speed of a motor of the ESP. The condition may be further determined based on a shape of the orbit.

The method 800 may further include performing a Fast Fourier Transform (or similar) on the orbit data and dividing by a natural frequency of the ESP to obtain respective magnitudes of a plurality of harmonics of the ESP, wherein the condition of the ESP is further determined based on the determined magnitudes. The method 800 may further include performing a fast Fourier transform on a portion of the orbit data corresponding to a time of acceleration of the ESP to generate waterfall plot data of change of a plurality of magnitudes of harmonics of the ESP over time. Determining the condition of the ESP may be further based on the waterfall plot data. Alternatively, the waterfall plot data may be of a change of the plurality of magnitudes of harmonics as a function of motor speed.

There may be two or more orthogonal high frequency (e.g., 5 kHz) and/or high temperature capable accelerometers to gauge or similar (replace current RMS velocity sensors) with limited additional complication to gauge (or equivalent e.g. energy harvesting device). The accelerometers may output the full vibration frequency spectrum within the range of the sensor (e.g., 0.5 Hz to 5 kHz). There may be additional high frequency (e.g., 5 kHz) and/or high temperature capable accelerometers at multiple locations along the string (e.g., motor/pump/protector) connected to gauge (or equivalent).

At least part of the method 800 may be performed as initial downhole processing of accelerometer data by integration to velocity and then displacement (orbit) data. The initial downhole processing may be performed on suitable processor/memory/storage/software base system in the gauge (or equivalent). The method may further include high bandwidth transmission of the displacement orbit of the ESP string (or raw accelerometer signal) from the gauge (or equivalent) to surface as a set of time-based points (e.g., 100-5000 points of X & Y magnitude vs. time per accelerometer). The orbit data may be further processed at the surface and/or processed at the gauge (where feasible and advantageous for reduced transmission bandwidths). The further processing may include outputting an RMS velocity vibration reading (RMS). The further processing may include recreating a tachometer signal or key phasor signal. The further processing may include indicating particular vibrational characteristics to allow remedial action to be taken, before installation and after deployment.

The method 800 may further include detecting rubs from a 0.5× harmonic, which may indicate an initiation of bearing failure. The method 800 may further include detecting motor bends from a 2× harmonic (e.g., the 2× harmonic is above a threshold), and in response, moving the motor/ESP to a less severe dog leg (e.g., by adjusting the speed of the motor until the 2× harmonic is below the threshold). The method 800 may further include changing speed or alternatively modifying the installation (e.g., add dampers), in response to detecting resonance. The further processing may indicate changes in operational characteristics of the ESP string with time. The further processing may provide information for root cause analysis of failures to allow implementation of correct fixes. The further processing may feed information to a machine learning algorithm or digital twins for further diagnostics/comparison. For example, root cause analysis of failures may be performed. What appears in the spectrum of vibrations from the root cause of failures may be discovered. The machine learning algorithm may then be trained to learn what vibration characteristics indicate a failure of a certain component (e.g., an imminent failure of a bearing). The trained machine learning algorithm may be applied to recognize conditions of the ESP based on processed accelerometer data.

Figure 9:
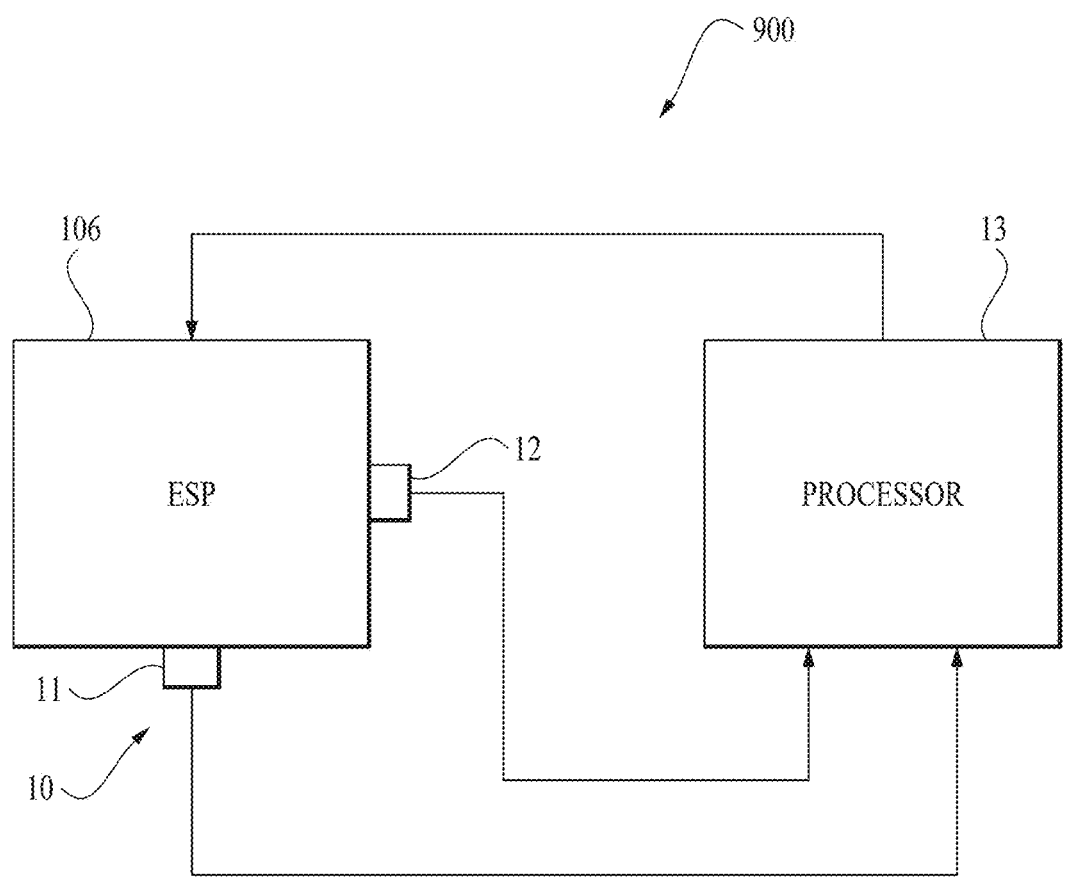
FIG. 9 is a schematic diagram of a system for processing the accelerometer data, according to an embodiment.

Referring to FIG. 9, an exemplary apparatus 900 for determining a condition of an ESP 106 (e.g., an ESP assembly) may include a processor 13 (e.g., one or more processors, which may or may not be all in the same physical location, e.g., a first processor may be downhole and a second processor may be at surface). The processor 13 may be configured to gather acceleration data from a first accelerometer 11 and a second accelerometer 12 (e.g., which may make up the pair of accelerometers 10) and/or additional accelerometers. The first accelerometer 11 and the second accelerometer 12 may affixed to and/or contained within the ESP 106. The first accelerometer 11 may be oriented orthogonally with respect to the second accelerometer 12. The processor 13 may obtain orbit data from the acceleration data; determine a magnitude of a harmonic of a rotational frequency of a motor of the ESP based on the orbit data; and/or determine a condition of the ESP based on the magnitude of the harmonic. The ESP may be adjusted based on the determined condition (e.g., by the processor sending a signal to the ESP 106, directly or indirectly, e.g., via a controller). The processor 13 may be configured to determine a magnitude of vibration at a natural frequency of the ESP based on the orbit, and adjust a speed of the ESP, in response to determining that the magnitude of vibration at the natural frequency of the ESP exceeds a threshold. The orbit may be obtained by twice integrating the acceleration data. The twice integrating the acceleration data may be performed downhole (e.g., in the ESP) by a first processor, and the determining of the condition of the ESP may be performed at surface (e.g., in a controller) by a second processor.

Figure 10:
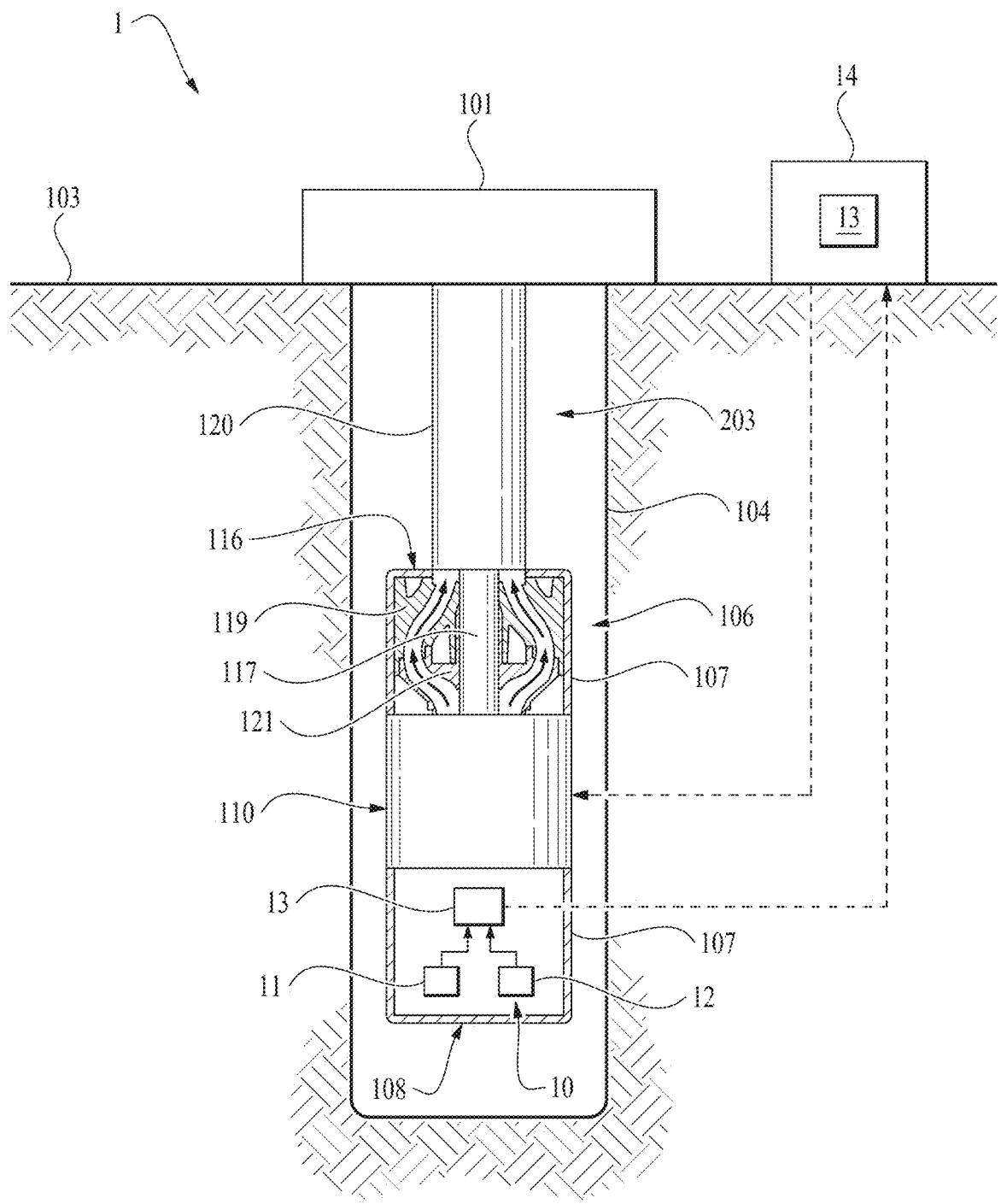
FIG. 10 is schematic diagram of a system for lifting fluid in a wellbore, according to an embodiment.

Referring to FIG. 10, a system 1 for lifting fluid in a wellbore may include an impeller 121 configured to lift fluid in a wellbore 203; a motor 110 configured to drive the impeller 121 which is within a diffuser 119 (e.g., the motor 110 may drive the impeller 121 via a shaft 117); a first accelerometer 11 mechanically coupled to the motor 110 (e.g., within a housing 107 of the ESP 106); a second accelerometer 12 mechanically coupled to the motor 110 (e.g., within a housing of the ESP 106) and oriented orthogonally with respect to the first accelerometer 11; one or more processors 13 configured to gather accelerometer data from the first accelerometer 11 and the second accelerometer 12, obtain orbit data from the accelerometer data, determine a magnitude of a harmonic of a rotational frequency of the motor 110 of the ESP 106 based on the orbit data, and determine a condition of the ESP 106 based on the magnitude of the harmonic. The system 1 may further include a controller 14 (e.g., containing one or more of the processors 13) configured to control the motor 110 based on the determined condition. As the impeller 121 rotates, wellbore fluid may be impelled through the diffuser and through the production tubing 120.

At least one of the one or more processors 13 may be disposed inside a housing 107 of the ESP 106 that contains the impellers 121 and the motor 110, and at least one of the processors 13 may be part of the controller 14 that is disposed at surface 103. The steps of gathering the accelerometer data, obtaining the orbit data, determining the magnitude of the harmonic, determining the condition of the ESP, and controlling the motor 110 may be shared or divided between two or more of the processors 13, wherein at least one of the processors 13 may be downhole and at least one may be at surface. The downhole processor 13 may be disposed in a sensor unit 108 e.g., along with the accelerometer pair 10. The surface processor 13 may be part or proximate to a controller 14. Example, the orbit may be obtained by twice integrating the acceleration data downhole by a first processor 13 disposed inside the housing 107, and the determining of the condition of the ESP may be performed at surface by a second processor 13, which is part of the controller 14.

As used herein, the term "housing" can refer to a continuous housing or a segmented housing (e.g., a housing comprising multiple housing segments). For example, the motor can be a separate module that has its own housing segment and the centrifugal pump (with impellers) can be a separate module with its own housing segment. The pump and motor housing segments can be bolted together (e.g., with a seal/motor protector positioned in between the pump and the motor). These housing segments can be collectively referred to as a "housing."

In some embodiments, the downhole processor 13 gathers the accelerometer data and transmits that data to the surface processor 13, which performs the steps of obtaining orbit data, determining the magnitude and phase of the harmonic, and determining the condition of the ESP 106. In some embodiments, the downhole processor 13 gathers the accelerometer data, obtains the orbit data, and transmits the orbit data to the surface processor 13, which performs the steps of determining the magnitude and phase of the harmonic and determining the condition of the ESP 106. In some embodiments, the downhole processor 13 gathers the accelerometer data, obtains the orbit, and determines the magnitude and phase of the harmonic, and transmits the magnitude and phase of the harmonic to the surface processor 13, which determines the condition of the ESP 106. In some embodiments, the downhole processor 13 gathers the accelerometer data, obtains the orbit data, determines the magnitude and phase of the harmonic, and determines the condition of the ESP 106, and transmits the condition of the ESP 106 to the surface processor 13. The surface processor 13 may determine an intervention based on the condition of the ESP 106, which may be executed by the controller 14 (which may contain the processor 13). In some embodiments, the downhole processor 13 gathers the accelerometer data, determines the magnitude and phase of the harmonic, determines the condition of the ESP 106, determines an intervention based on the condition, and transmits information about the intervention to the surface processor 13. The controller 14 may execute the corrective action (e.g., by using the surface processor 13). The step of obtaining the orbit data from the accelerometer data may include twice integrating the accelerometer data. The downhole processor 13 may perform at least some of the method steps to facilitate telemetry. For example, it may avoid the need to transmit raw accelerometer data to the surface, which may have a resolution of thousands of points per second. One or more of the controlling steps could even be performed by the downhole processor 13 additionally or alternatively to the controller 14 at surface.

In some embodiments, the one or more processors 13 determine that a rotational frequency of the motor matches a natural frequency of the ESP 106, and in response, the controller 14 adjusts a speed of the motor 110 up or down to avoid the natural frequency. The one or more processors 13 may determine whether the rotational frequency matches the natural frequency based on the magnitude and the phase angle. For example, in response to detecting that a phase angle flips at a particular (e.g., high) harmonic in relation to the rotational frequency, the one or more processors 13 may determine that the rotation frequency matches the natural frequency. In response to this determination, the controller 14 may adjust the speed of the motor 110 up or down to avoid the natural frequency. In a similar fashion the controller 14 can limit operation at the natural frequency.

The one or more processors 13 may determine a location and/or an angle of an imbalance in the motor 110 based on the phase angle. This information may be used to place weights in the motor and/or on the shaft 117 for balance.

In some embodiments, the one or more processors 13 use a trained machine learning model to determine a condition of the ESP 106. For example, the machine learning model may analyze a size and/or shape of the orbit, recognize that the shape matches other instances of a condition of the ESP (e.g., a condition in which the shaft 117 was bent), and then output information about the condition of the ESP (e.g., information that the shaft 117 is bent) and/or automatically take a corrective action such as adjusting the speed of the motor 110.

In some embodiments, there may be magnitude thresholds respectively assigned to the harmonics. In response to the one or more processors 13 detecting that a magnitude threshold of one of the harmonics is exceeded, the controller 14 may alter (e.g., reduce) the speed of the motor 110 until (e.g., to the extent that) the magnitude of that particular harmonic falls below the threshold.

According to the system and method of present disclosure, vibration data can be advantageously used to assess the health of the ESP during operation. This can enable early detection of problems, avoiding consequential damage to hardware, avoiding harmful natural frequencies of the ESP string, preventing damage to the ESP string, and/or understanding failure causes to allow future enhancements to mitigate the problem. Implementing the system and method of the present disclosure may result in greater reliability of the ESP system while avoiding the use of certain expensive sensor technology. The system and method of the present disclosure may have the advantage over the conventional art of only requiring accelerometers to obtain magnitudes of harmonics which can be used to determine a condition of the ESP. Sensors that directly measure velocity and displacement may be omitted, which may reduce overall system cost and complexity.

Additional Disclosure

The following are non-limiting, specific embodiments in accordance with the present disclosure:

In a first embodiment, a processor-implemented method of determining a condition of an electric submersible pump (ESP) includes gathering acceleration data from a first accelerometer and a second accelerometer, wherein the first accelerometer and the second accelerometer are affixed to the ESP, and wherein the first accelerometer is oriented orthogonally with respect to the second accelerometer; obtaining orbit data from the acceleration data; determining a magnitude of a harmonic of a rotational frequency of a motor of the ESP based on the orbit data; and determining a condition of the ESP based on the magnitude of the harmonic, wherein the ESP is adjusted based on the determined condition.

A second embodiment can include the method of the first embodiment, further comprising determining a phase angle of an imbalance of the ESP based on the orbit data, wherein the condition of the ESP is further determined based on the phase angle.

A third embodiment can include the method of the first or second embodiments, wherein the condition of the ESP is further based on a shape of the orbit.

A fourth embodiment can include the method of any of the first through third embodiments, wherein the orbit comprises x-values of displacement and y-values of displacement as a function of time.

A fifth embodiment can include the method of any of the first through fourth embodiments, wherein the first accelerometer and the second accelerometer are oriented radially with respect to the ESP.

A sixth embodiment can include the method of any of the first through fifth embodiments, wherein the first accelerometer and the second accelerometer are part of a two-axis accelerometer affixed to the ESP.

A seventh embodiment can include the method of any of the first through sixth embodiments, wherein the first accelerometer and the second accelerometer are part of a 3-axis accelerometer affixed to the ESP.

An eighth embodiment can include the method of any of the first through seventh embodiments, further comprising stopping the ESP, in response to the magnitude and the phase indicating imminent damage to the ESP.

A ninth embodiment can include the method of any of the first through eighth embodiments, wherein the determining of the magnitude of the harmonic of a rotational frequency of a motor of the ESP comprises determining a magnitude of vibration at a natural frequency of the ESP based on the orbit, and adjusting a speed of the ESP, in response to determining that the magnitude or phase angle of vibration at the natural frequency of the ESP exceeds a threshold.

A tenth embodiment can include the method of any of the first through ninth embodiments, further comprising integrating the acceleration data over time to generate velocity data, wherein the determining of the condition of the ESP is further based on the velocity data.

An eleventh embodiment can include the method of any of the first through tenth embodiments, further comprising integrating the velocity data over time to generate positional data, wherein the orbit data comprises the positional data.

A twelfth embodiment can include the method of any of the first through eleventh embodiments, wherein the orbit is obtained by twice integrating the acceleration data over time to generate positional data, wherein the orbit data comprises the positional data.

A thirteenth embodiment can include the method of any of the first through twelfth embodiments, wherein the orbit is generated based on a signal from a tachometer coupled to a shaft of the ESP.

A fourteenth embodiment can include the method of any of the first through thirteenth embodiments, wherein the orbit is generated by detecting zero crossing points of a waveform of the accelerometer data.

A fifteenth embodiment can include the method of any of the first through fourteenth embodiments, wherein the harmonic is a second harmonic of a rotational frequency of a motor of the ESP, and wherein the determining of the condition of the ESP comprises determining that a shaft of the ESP is bent, in response to determining that the magnitude of a second harmonic exceeds a threshold.

A sixteenth embodiment can include the method of any of the first through fifteenth embodiments, wherein the harmonic is a half harmonic of a rotational frequency of a motor of the ESP, and wherein the determining of the condition of the ESP comprises determining that there is a rub between a static component of the ESP and a rotating component of the ESP, in response to determining that the magnitude of the half harmonic exceeds a threshold.

A seventeenth embodiment can include the method of any of the first through sixteenth embodiments, wherein the adjustment of the ESP comprises stopping the ESP for repairs.

An eighteenth embodiment can include the method of any of the first through seventeenth embodiments, wherein the adjustment of the ESP comprises adjusting a speed of a motor of the ESP.

A nineteenth embodiment can include the method of any of the first through eighteenth embodiments, wherein the condition is further determined based on a shape of the orbit.

A twentieth embodiment can include the method of any of the first through nineteenth embodiments, further comprising performing a Fast Fourier Transform, Discrete Fourier Transform (DFT), or similar time to frequency conversion method, on the orbit data and dividing by the operating frequency (e.g., the motor speed) of the ESP to obtain respective magnitudes of a plurality of harmonics of the ESP, wherein the condition of the ESP is further determined based on the determined magnitudes.

A twenty-first embodiment can include the method of any of the first through twentieth embodiments, further comprising performing a Fast Fourier Transform (or similar) on a portion of the orbit data corresponding to a time of acceleration of the ESP to generate waterfall plot data of change of a plurality of magnitudes of harmonics of the ESP over time, wherein the condition of the ESP is further based on the waterfall plot data.

A twenty-second embodiment can include the method of any of the first through twenty-first embodiments, wherein there are two or more orthogonal high frequency (e.g., 5 kHz) and/or high temperature capable accelerometers to gauge or similar (replace current RMS velocity sensors) with limited additional complication to gauge (or equivalent e.g. energy harvesting device).

A twenty-third embodiment can include the method of any of the first through twenty-second embodiments, wherein the accelerometers output the full vibration frequency spectrum within the range of the sensor (e.g., 0.5 Hz to 5 kHz).

A twenty-fourth embodiment can include the method of any of the first through twenty-fourth embodiments, wherein there are additional high frequency (e.g., 5 kHz) and/or high temperature capable accelerometers at multiple locations along the string (e.g., motor/pump/protector) connected to gauge (or equivalent).

A twenty-fifth embodiment can include the method of any of the first through twenty-fourth embodiments, wherein at least part of the method is performed as initial downhole processing of accelerometer data by integration to velocity and then displacement (e.g., orbit) data as required.

A twenty-sixth embodiment can include the method of any of the first through twenty-fifth embodiments, wherein the initial downhole processing is performed on suitable processor/memory/storage/software base system in the gauge (or equivalent).

A twenty-seventh embodiment can include the method of any of the first through twenty-sixth embodiments, further comprising high bandwidth transmission of the displacement orbit of the ESP string (or raw accelerometer signal) from the gauge (or equivalent) to surface as a set of time-based points (e.g., 100-5000 points of X & Y magnitude vs time per accelerometer).

A twenty-eighth embodiment can include the method of any of the first through twenty-seventh embodiments, wherein the orbit data is further processed at the surface.

A twenty-ninth embodiment can include the method of any of the first through twenty-eighth embodiments, wherein the orbit data is further processed at the gauge (where feasible and advantageous for reduced transmission bandwidths).

A thirtieth embodiment can include the method of any of the first through twenty-ninth embodiments, wherein the further processing comprises outputting an RMS velocity vibration reading (RMS).

A thirty-first embodiment can include the method of any of the first through thirtieth embodiments, wherein the further processing comprises recreating a tachometer signal or key phasor signal.

A thirty-second embodiment can include the method of any of the first through thirty-first embodiments, wherein the further processing comprises indicating particular vibrational characteristics to allow remedial action to be taken, before installation and after deployment.

A thirty-third embodiment can include the method of any of the first through thirty-second embodiments, further comprising detecting rubs from a 0.5× harmonic, which indicates an initiation of bearing failure.

A thirty-fourth embodiment can include the method of any of the first through thirty-third embodiments, further comprising detecting motor bends from a 2× harmonic, and in response, moving the motor/ESP to a less severe dog leg.

A thirty-fifth embodiment can include the method of any of the first through thirty-fourth embodiments, further comprising changing speed or alternatively modifying the installation (e.g., add dampers), in response to detecting resonance.

A thirty-sixth embodiment can include the method of any of the first through thirty-fifth embodiments, wherein the further processing indicates changes in operational characteristics of the ESP string with time.

A thirty-seventh embodiment can include the method of any of the first through thirty-sixth embodiments, wherein the further processing provides information for root cause analysis of failures to allow implementation of correct fixes.

A thirty-eighth embodiment can include any of the first through thirty-seventh embodiments, wherein the further processing feeds information to a machine learning algorithm or digital twins for further diagnostics/comparison.

A thirty-ninth embodiment can include a non-transitory computer-readable medium that, when executed by one or more processors, causes the one or more processors to execute the method of any of the first through thirty-eighth embodiments.

In a fortieth embodiment, an apparatus for determining a condition of an electric submersible pump (ESP) comprises one or more processors configured to: gather acceleration data from a first accelerometer and a second accelerometer, wherein the first accelerometer and the second accelerometer are affixed to the ESP, and wherein the first accelerometer is oriented orthogonally with respect to the second accelerometer; obtain orbit data from the acceleration data; determine a magnitude of a harmonic of a rotational frequency of a motor of the ESP based on the orbit data; and determine a condition of the ESP based on the magnitude of the harmonic, wherein the ESP is adjusted based on the determined condition.

A forty-first embodiment can include the apparatus of the fortieth embodiment, wherein the one or more processors are further configured to determine a magnitude of vibration at a natural frequency of the ESP based on the orbit, and adjust a speed of the ESP, in response to determining that the magnitude of vibration at the natural frequency of the ESP exceeds a threshold.

A forty-second embodiment can include the apparatus of the fortieth or forty-first embodiments, wherein the orbit is obtained by twice integrating the acceleration data.

In a forty-third embodiment, an electric submersible pump (ESP) comprises impellers configured to lift fluid in a wellbore; a motor configured to drive the impellers; a first accelerometer; a second accelerometer oriented orthogonally with respect to the first accelerometer; one or more processors configured to gather accelerometer data from the first accelerometer and the second accelerometer, obtain orbit data from the accelerometer data, determine a magnitude of a harmonic of a rotational frequency of a motor of the ESP based on the orbit data, and determine a condition of the ESP based on the magnitude of the harmonic; and a controller configured to control the motor based on the determined condition.

A forty-fourth embodiment can include the ESP of the forty-third embodiment, wherein at least one of the one or more processors is disposed inside a housing of the ESP that contains the impellers and the motors, and the controller is disposed at surface.

A forty-fifth embodiment can include the ESP of the forty-third or forty-fourth embodiments, wherein at least one of the one or more processors is disposed proximate the controller.

A forty-sixth embodiment can include the ESP of any of the forty-third through forty-fifth embodiments, wherein the first accelerometer and the second accelerometer are disposed in or on the housing.

In a forty-seventh embodiment, an electric submersible pump includes an impeller configured to lift fluid in a wellbore; a motor configured to drive the impeller; a housing enclosing the impeller and the motor; pairs of accelerometers longitudinally distributed along the housing, wherein each of the pairs of accelerometers comprises a first accelerometer and a second accelerometer oriented orthogonally with respect to the first accelerometer; and one or more processors configured to gather accelerometer data from the pairs of accelerometers, obtain orbit data from the accelerometer data, determine magnitudes of harmonics at locations of the pairs of accelerometers, and determine a condition of the electric submersible pump based on the magnitudes of the harmonics, wherein an operation of the motor is altered based on the determined conditions.

A forty-eighth embodiment can include the electric submersible pump of the forty-seventh embodiment, further comprising interpolating magnitudes of harmonics between the locations of the pairs of accelerometers to obtain a profile of the magnitudes of the harmonics, wherein the one or more processors are further configured to determine the condition of the electric submersible pump based on the profile of the magnitudes of the harmonics.

A forty-ninth embodiment can include the electric submersible pump of the forty-seventh or forty-eighth embodiments, wherein the condition of the ESP is determined using a machine learning algorithm.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Disclosure of a singular element should be understood to provide support for a plurality of the element. It is contemplated that elements of the present disclosure may be duplicated in any suitable quantity.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" does not require selection of only one element. Thus, the phrase "A or B" is satisfied by either one or both elements from the set {A, B}, including multiples of either element; and the phrase "A, B, or C" is satisfied by any element from the set {A, B, C} or any combination thereof, including multiples of any element. A clause that recites "A, B, or C" can be infringed with only one of the listed items, multiple of the listed items, and one or more of the items in the list and another item not listed.

As used herein, the article "a" means "one or more." As used herein, the article "an" means "one or more." As used herein, the article "the" when referring to a singular noun means "the one or more." Thus, the phrase "an element" means "one or more elements;" and the phrase "the element" means "the one or more elements."

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A processor-implemented method of determining a condition of an electric submersible pump (ESP), comprising:
    gathering acceleration data from a first accelerometer and a second accelerometer, wherein the first accelerometer and the second accelerometer are affixed to the ESP, and wherein the first accelerometer is oriented orthogonally with respect to the second accelerometer;
    obtaining orbit data from the acceleration data;
    determining a magnitude of a harmonic based on the orbit data; and
    determining a condition of the ESP based on the magnitude of the harmonic,
    wherein a speed of a motor of the ESP is adjusted based on the determined condition.

2. The method of claim 1, further comprising determining a phase of an imbalance of the ESP based on the orbit data, wherein the condition of the ESP is further determined based on phase angle.

3. The method of claim 1, wherein the condition of the ESP is further determined based on a shape of an orbit of the orbit data.

4. The method of claim 1, wherein the orbit data comprises x-values of displacement and y-values of displacement over time.

5. The method of claim 1, wherein
    the first accelerometer and the second accelerometer are oriented radially with respect to the ESP, and
    the first accelerometer and the second accelerometer are part of a 2-axis accelerometer or a 3-axis accelerometer.

6. The method of claim 1, wherein the acceleration data is integrated to obtain velocity data, and the velocity data is integrated to obtain the orbit data.

7. The method of claim 6, wherein the integrating of the acceleration data is performed downhole, and the determining of the condition of the ESP is performed at surface.

8. The method of claim 1, wherein a zero reference angle of the orbit data is detected based on a reference pulse generated by a tachometer coupled to a shaft of the ESP.

9. The method of claim 1, wherein a zero reference angle of the orbit data is detected based on zero crossing points of a waveform of the acceleration data.

10. The method of claim 1, wherein
    the harmonic is a second harmonic of a rotational frequency of a motor of the ESP, and
    the determining of the condition of the ESP comprises determining that a shaft of the ESP is bent, in response to determining that the magnitude of a second harmonic exceeds a threshold.

11. The method of claim 1, wherein
    the harmonic is a half harmonic of a rotational frequency of a motor of the ESP, and
    the determining of the condition of the ESP comprises determining that there is a rub between a static component of the ESP and a rotating component of the ESP, in response to determining that the magnitude of the half harmonic exceeds a threshold.

12. The method of claim 1, wherein the adjusting of the ESP comprises stopping the ESP for repairs.

13. The method of claim 1, wherein the determining of the condition of the ESP comprises determining the condition of the ESP using a machine learning algorithm.

14. An apparatus for determining a condition of an electric submersible pump (ESP), comprising:
one or more processors configured to:
gather acceleration data from a first accelerometer and a second accelerometer, wherein the first accelerometer and the second accelerometer are affixed to the ESP, and wherein the first accelerometer is oriented orthogonally with respect to the second accelerometer;
obtain orbit data from the acceleration data;
determine a magnitude of a harmonic based on the orbit data; and
determine a condition of the ESP based on the magnitude of the harmonic, wherein a speed of the ESP is adjusted based on the determined condition.

15. The apparatus of claim 14, wherein the one or more processors are further configured to determine a magnitude of vibration at a natural frequency of the ESP based on the orbit data, and adjust the speed of the ESP, in response to determining that the magnitude and phase angle of vibration at the natural frequency of the ESP exceeds a threshold.

16. The apparatus of claim 14, wherein the acceleration data is integrated to obtain velocity data, and the velocity data is integrated to obtain the orbit data.

17. The apparatus of claim 16, wherein the twice integrating of the acceleration data is performed downhole by a first processor of the one or more processors, and the determining of the condition of the ESP is performed at surface by a second processor of the one or more processors.

18. The apparatus of claim 14, wherein the one or more processors are further configured to determine the condition of the ESP by using a machine learning algorithm.

19. A system for lifting fluid in a wellbore, comprising:
an impeller configured to lift fluid in a wellbore;
a motor configured to drive the impeller;
a first accelerometer mechanically coupled to the motor;
a second accelerometer mechanically coupled to the motor and oriented orthogonally with respect to the first accelerometer;
one or more processors configured to gather acceleration data from the first accelerometer and the second accelerometer, obtain orbit data from the accelerometer data, determine a magnitude of a harmonic of a rotational frequency of the motor based on the orbit data, and determine a condition of the system based on the magnitude of the harmonic; and
a controller configured to control a speed of the motor based on the determined condition.

20. The system of claim 19, wherein
at least one of the one or more processors is disposed inside a housing of the system that contains the impeller and the motor, and
the controller is disposed at surface.

21. The system of claim 20, wherein
the acceleration data is integrated downhole by a first processor of the one or more processors to obtain velocity data,
the velocity data is integrated downhole by the first processor to obtain the orbit data, and
the determining of the condition of the system is performed at surface by a second processor of the one or more processors, which is part of the controller.

22. The system of claim 19, wherein the one or more processors are further configured to determine the condition of the system by using a machine learning algorithm.

23. An electric submersible pump, comprising:
an impeller configured to lift fluid in a wellbore;
a motor configured to drive the impeller;
a housing enclosing the impeller and the motor;
pairs of accelerometers longitudinally distributed along the housing, wherein each of the pairs of accelerometers comprises a first accelerometer and a second accelerometer oriented orthogonally with respect to the first accelerometer; and
one or more processors configured to gather acceleration data from the pairs of accelerometers, obtain orbit data from the accelerometer data, determine magnitudes of harmonics at respective locations of the pairs of accelerometers, and determine a condition of the electric submersible pump, using a machine learning algorithm, based on the magnitudes of harmonics,
wherein an operation of the motor is altered based on the determined condition.

24. The electric submersible pump of claim 23, further comprising interpolating the magnitudes of harmonics between the locations of the pairs of accelerometers to obtain a profile of the magnitudes of harmonics, wherein the one or more processors are further configured to determine the condition of the electric submersible pump based on the profile of the magnitudes or phase angle of the harmonics.

* * * * *